US008597471B2

(12) United States Patent
Avery et al.

(10) Patent No.: US 8,597,471 B2
(45) Date of Patent: Dec. 3, 2013

(54) HEAT DRIVEN CONCENTRATOR WITH ALTERNATE CONDENSERS

(75) Inventors: Randall N. Avery, Bogart, GA (US); Charlie Booth, Walkinsville, GA (US)

(73) Assignee: Industrial Idea Partners, Inc., Athens, GA (US)

( * ) Notice: Subject to any disclaimer, the term of this patent is extended or adjusted under 35 U.S.C. 154(b) by 412 days.

(21) Appl. No.: 12/859,729

(22) Filed: Aug. 19, 2010

(65) Prior Publication Data
US 2012/0042688 A1    Feb. 23, 2012

(51) Int. Cl.
*B01D 3/00* (2006.01)

(52) U.S. Cl.
USPC .......... 203/5; 203/10; 203/41; 203/71; 62/620

(58) Field of Classification Search
USPC ................. 203/5, 10, 41, 71; 202/154, 158; 95/118; 62/620
See application file for complete search history.

(56) References Cited

U.S. PATENT DOCUMENTS

| 278,526 | A | 2/1957 | Fleck |
|---|---|---|---|
| 3,087,791 | A | 4/1963 | Becker |
| 3,516,170 | A | 6/1970 | Liobis |
| 3,679,366 | A | 7/1972 | Benson |
| 3,695,841 | A | 10/1972 | Zirker |
| 3,711,598 | A | 1/1973 | Babcock |
| 3,713,273 | A | 1/1973 | Coffee |
| 3,789,112 | A | 1/1974 | Pachaly |
| 3,888,974 | A | 6/1975 | Stevens |
| 3,937,649 | A | 2/1976 | Ridgely |
| 4,055,276 | A | 10/1977 | Solomon |
| 4,081,431 | A | 3/1978 | Stephan |
| 4,085,061 | A | 4/1978 | O'Brien |
| 4,173,620 | A | 11/1979 | Shimizu |
| 4,190,507 | A | 2/1980 | Hesky |
| 4,190,515 | A | 2/1980 | Butler |
| 4,206,185 | A | 6/1980 | Hesky |
| 4,217,332 | A | 8/1980 | Hindin |
| 4,304,645 | A | 12/1981 | Pierini |
| 4,444,737 | A | 4/1984 | Tsuchiya |
| 4,478,057 | A | 10/1984 | Lotz |
| 4,487,670 | A | 12/1984 | Bellanger |

(Continued)

FOREIGN PATENT DOCUMENTS

| JP | 2000-199656 | 7/2000 |
|---|---|---|
| JP | 2006-308247 | 11/2006 |

(Continued)

OTHER PUBLICATIONS

U.S. Appl. No. 12/550,290, filed Aug. 28, 2009, Avery.

(Continued)

*Primary Examiner* — Nina Bhat
(74) *Attorney, Agent, or Firm* — Miller & Martin PLLC

(57) ABSTRACT

A method for concentrating contaminated sorbate in a solution which includes contaminated sorbate and clean sorbate is described wherein contaminated sorbate having a freezing point which is higher than the freezing point of the clean sorbate is cooled to a temperature below the freezing point of the contaminated sorbate and above the freezing point of the clean sorbate to concentrate the contaminated sorbate by cycling alternately from a desorption cycle to an adsorption cycle. By maintaining the solution at a temperature between the freezing point of the contaminated sorbate and the freezing point of the clean sorbate, the clean sorbate can be evaporated off.

10 Claims, 2 Drawing Sheets

(56) References Cited

U.S. PATENT DOCUMENTS

| | | |
|---|---|---|
| 4,490,349 A | 12/1984 | Horvath |
| 4,522,894 A | 6/1985 | Hwang |
| 4,531,384 A | 7/1985 | Paeye |
| 4,532,102 A | 7/1985 | Cawley |
| 4,561,191 A | 12/1985 | Parkinson |
| 4,584,781 A | 4/1986 | Parkinson |
| 4,634,454 A | 1/1987 | Khan |
| 4,637,866 A | 1/1987 | Konishi |
| 4,657,747 A | 4/1987 | Swansiger |
| 4,673,547 A | 6/1987 | Iniotakis |
| 4,687,644 A | 8/1987 | Iniotakis |
| 4,709,558 A | 12/1987 | Matsushita |
| 4,743,167 A | 5/1988 | Martelli |
| 4,755,471 A | 7/1988 | Saito |
| 4,759,878 A | 7/1988 | Henrich |
| 4,762,685 A | 8/1988 | Swansiger |
| 4,766,081 A | 8/1988 | Ruckert |
| 4,774,065 A | 9/1988 | Penzhorn |
| 4,805,317 A | 2/1989 | Inglis |
| 4,816,228 A | 3/1989 | Yoshida |
| 4,820,477 A | 4/1989 | McNally |
| 4,849,155 A | 7/1989 | Penzhorn |
| 4,875,945 A | 10/1989 | Penzhorn |
| 4,881,376 A | 11/1989 | Yonezawa |
| 4,882,093 A | 11/1989 | Giroux |
| 4,892,684 A | 1/1990 | Harp |
| 4,950,426 A | 8/1990 | Markowitz |
| 4,996,033 A | 2/1991 | Garner-Chavis |
| 5,005,371 A | 4/1991 | Yonezawa |
| 5,015,863 A | 5/1991 | Takeshima |
| 5,024,064 A | 6/1991 | Yonezawa |
| 5,055,237 A | 10/1991 | Husseiny |
| 5,154,878 A | 10/1992 | Busigin |
| 5,180,568 A | 1/1993 | Boffito |
| 5,191,721 A | 3/1993 | Incorvia |
| 5,223,269 A | 6/1993 | Liepins |
| 5,227,598 A | 7/1993 | Woodmansee |
| 5,245,839 A | 9/1993 | Chang |
| 5,298,196 A | 3/1994 | Heung |
| 5,312,597 A | 5/1994 | Heung |
| 5,377,234 A | 12/1994 | Robles |
| 5,411,712 A | 5/1995 | Woodmansee |
| 5,445,803 A | 8/1995 | Dworschak |
| 5,451,322 A | 9/1995 | Nelson |
| 5,464,988 A | 11/1995 | Rossmassler |
| 5,468,462 A | 11/1995 | Miller |
| 5,505,829 A | 4/1996 | Villa-Aleman |
| 5,545,796 A | 8/1996 | Roy |
| 5,558,844 A | 9/1996 | Succi |
| 5,610,438 A | 3/1997 | Wallace |
| 5,619,866 A | 4/1997 | Sato |
| 5,661,299 A | 8/1997 | Purser |
| 5,775,126 A | 7/1998 | Sato |
| 5,823,003 A | 10/1998 | Roser |
| 5,832,392 A | 11/1998 | Forsberg |
| 5,939,330 A | 8/1999 | Peterson |
| 5,954,968 A | 9/1999 | Patterson |
| 5,979,228 A | 11/1999 | Smith |
| 6,110,373 A | 8/2000 | Patterson |
| 6,116,039 A * | 9/2000 | Pfister et al. ............... 62/259.2 |
| 6,159,427 A | 12/2000 | Kherani |
| 6,165,438 A | 12/2000 | Willms |
| 6,203,483 B1 | 3/2001 | Birdwell |
| 6,321,565 B1 | 11/2001 | Kihara |
| 6,332,914 B1 | 12/2001 | Lee |
| 6,348,153 B1 | 2/2002 | Patterson |
| 6,432,174 B1 | 8/2002 | Heung |
| 6,436,352 B1 | 8/2002 | Succi |
| 6,440,054 B1 | 8/2002 | Galik |
| 6,490,875 B2 | 12/2002 | Chua |
| 6,517,708 B1 | 2/2003 | Patterson |
| 6,632,367 B1 | 10/2003 | Furlong |
| 6,699,169 B2 | 3/2004 | Ogino |
| 6,731,714 B1 | 5/2004 | Bugeon |
| 6,895,779 B2 | 5/2005 | Jeuch |
| 6,984,327 B1 | 1/2006 | Patterson |
| 7,000,426 B2 | 2/2006 | Jeuch |
| 7,082,781 B2 | 8/2006 | Kikuchi |
| 7,201,013 B2 | 4/2007 | Yabu |
| 7,257,990 B2 | 8/2007 | Bujas |
| 7,291,271 B2 | 11/2007 | Galbraith |
| 7,470,350 B2 * | 12/2008 | Bonnett et al. ............... 203/5 |
| 7,922,875 B2 * | 4/2011 | Kambe et al. ............... 203/5 |
| 8,016,981 B2 * | 9/2011 | Savinov et al. ............... 203/71 |
| 2004/0042972 A1 | 3/2004 | Truong-Le |
| 2005/0279129 A1 | 12/2005 | Muchnik |
| 2006/0016681 A1 | 1/2006 | Muchnik |
| 2007/0246344 A1 | 10/2007 | Bonnett |
| 2009/0057127 A1 | 3/2009 | Fang |
| 2009/0255350 A1 | 10/2009 | Decker |
| 2009/0301228 A1 | 12/2009 | Baron |
| 2010/0021372 A1 | 1/2010 | Bonnett |
| 2010/0122564 A1 | 5/2010 | Crosson |
| 2010/0178237 A1 | 7/2010 | Bonnett |

FOREIGN PATENT DOCUMENTS

| | | |
|---|---|---|
| JP | 2007-237140 | 9/2007 |
| JP | 2007-245014 | 9/2007 |
| JP | 2008-212881 | 9/2008 |
| JP | 2008-264749 | 11/2008 |
| JP | 2009-056343 | 3/2009 |
| WO | WO/95/10347 | 4/1995 |
| WO | WO/00/33932 | 6/2000 |
| WO | WO/01/61709 | 8/2001 |
| WO | WO/02/066910 | 8/2002 |
| WO | WO/02/067353 | 8/2002 |
| WO | WO/2004/094928 | 11/2004 |
| WO | WO/2006/121414 | 11/2006 |
| WO | WO/2009/058099 | 5/2009 |

OTHER PUBLICATIONS

F. Baumgartner, M. Kim, Isotope Effects in Equilibrium and Non-Equilibrium Vaporization of Tritiated Water and Ice, Appl. Radiat. Isot. vol. 41, No. 4, pp. 395-399 (1990).

H.T. Chua, K.C. Ng, A. Malek, T. Kashiwagi, A. Akisawa, B.B. Saha, Modeling the performance of two-bed, silica gel-water adsorption chillers, International Journal of Refrigeration, 22 (1999) pp. 194-204.

H.T. Chue, K.C, Ng, A. Malek, T. Kashiwagi, A. Akisawa, B.B, Saha, Modeling the performance of two-bed, silica gel-water adsorption chillers, International Journal of Refrigeration, 22 (1999) Erratum.

D. Zejli, R. Benchrifa, A. Bennouna, O.K. Bouhelal, A solar adsorption desalination device; first simulation results, Desalination, 168 (2004) pp. 127-135.

Xiaolin Wang, Kim Choon Ng, Experimental investigation of an adsorption desalination plant using low-temperature waste heat, Applied Thermal Engineering, 25 (2005) pp. 2780-2789.

Anutosh Chakraborty, Bidyut Baran Saha, Ibrahim I. El-Sharkawy, Shigeru Koyama, Kandadai Spinvsan and Kim Choon Ng, Theory and experimental validation on isosteric heat of adsorption for an adsorbent + adsorbate system, High Temperatures-High Pressures, vol. 37, pp. 109-117.

Faculty of Engineering at National University of Singapore, Adsorption Desalination to Quench Global Thirst, JUS Engineering Research, Oct. 2008, vol. 23, No. 3.

I. El-Sharkawy, K. Thu, K. C. Ng, B. B. Saha, A. Chakraborty, S. Koyama, Performance Improvement of Adsorption Desalination Plant: Experimental Investigation, International Review of Mechanical Engineering, vol. 1, n. 1, pp. 25-31, 2007.0.

U.S. Bureau of Reclamation—Sandia National Laboratories, Desalination and Water Purification Technology Roadmap—A Report of the Executive Committee, © 2003.

Yuan Zhou, Richard S.J. Tol, Evaluating the costs of desalination and water transport, Working Papers Research Unit Sustainability and Global Changes FNY-41 revised.

* cited by examiner

HEAT DRIVEN CONCENTRATOR WITH ALTERNATE CONDENSERS

BACKGROUND OF THE INVENTION

This invention relates generally to a device and method for separating or concentrating different isotopologues of water. Isotopologues are molecules that differ only in their isotopic composition. Hydrogen-related isotopologues of normal or "light" water ($H_2O$) include "semi-heavy water" having a single deuterium isotope (HDO or $^1H^2HO$), "heavy water" with two deuterium isotopes ($D_2O$ or $^2H_2O$), tritiated water having a single tritium isotope (HTO or $^3HOH$) and "super-heavy water" ($T_2O$ or $^3H_2O$). For purposes of this disclosure, the term tritiated water will be used to refer to any water molecule in which one or both hydrogen atoms are replaced with a tritium isotope. Tritiated water is a byproduct of nuclear power generating stations. The present invention is especially useful as a method of enriching tritiated water for disposal by evaporation and concentration.

Tritium is chemically represented as T or $^3H$ and is a radioactive isotope of hydrogen. Tritium is most often produced in heavy water-moderated nuclear reactors. This production occurs when deuterium (heavy water) captures a neutron in a reaction having a very small cross section, producing tritium in the form of tritiated water (HTO). Relatively little tritiated water is produced. Nevertheless, cleaning tritiated water from the moderator may be desirable after several years of operation of the nuclear station to reduce the risk of tritiated water escaping to the environment. Very few facilities exist that can properly clean or separate tritiated water from a solution or mixture of tritiated water and normal water. The scarcity of facilities makes it necessary to transport relatively large volumes of contaminated water solution containing relatively small volumes of tritiated water across long distances to a location such as Ontario Power Generation's Tritiated Water Removal Facility. Ontario Power's facility can process up to 2.5 thousand tons (2,500 Mg) of contaminated heavy water per year, producing about 2.5 kg of tritiated water.

Tritiated water is produced in pressurized light water reactors as well. The prevalence is directly related to the use of Boron-10 as a chemical reactivity shim. A shim is used to convert high energy neutrons to thermal heat. The production of this isotope follows this reaction:

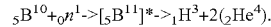
$$_5B^{10} + _0n^1 \rightarrow [_5B^{11}]^* \rightarrow _1H^3 + 2(_2He^4).$$

The half-life of tritiated water is 12.4 years. This is troublesome because it is persistent enough to concentrate in the reactor water. Tritiated water causes no ill reactivity effects within the nuclear reactor, but it does provide a significant risk for contamination from small leaks.

Tritium is chemically identical to hydrogen, so it readily bonds with OH as tritiated water (HTO), and can make organic bonds (OBT) easily. The HTO and the OBT are easily ingested by consuming contaminated organic or water-containing foodstuffs. As tritium is not a strong beta emitter, it is not dangerous externally, however, it is a radiation hazard when inhaled, ingested via food or water, or absorbed through the skin. In the form of tritiated water molecules, it can be absorbed through pores in the skin, leading to cell damage and an increased chance of cancer.

HTO has a short biological half life in the human body of 7 to 14 days which both reduces the total effects of single-incident ingestion and precludes long-term bioaccumulation of HTO from the environment. HTO does not accumulate in tissue.

For purposes of this disclosure, the term "water" will be used to refer to H2O, and, where appropriate, other isotopologues will be referred to by name. A solution comprising water and one or more other hydrogen-related isotopologues of water will be referred to as a "contaminated water solution".

Enrichment of tritiated water by removing the excess water and concentrating the tritiated water can significantly reduce the expense of transporting very low level contaminated materials to a cleaning facility. The available processes are not commercially attractive when starting with low concentrations of tritium as tritiated water because of the transportation costs. No low cost processes have been demonstrated for the concentration of tritiated water due to the fact that it has physical and chemical characteristics that are so similar to water that it precludes normal chemical or thermodynamic measures. These close similarities make it difficult to define processes that will separate the tritiated water from water.

In fact, the preferred sorbents utilized in the sorbent/sorbate working pair adsorption process of the present invention function regardless of whether pure water functions as the sorbate or whether tritiated water or a contaminated water solution function as the sorbate. The adsorption/desorption process at the heart of the present invention will work equally well with all hydrogen-related isotopologues of water.

However, the method and device of the present invention relies on one of the physical characteristic differences between tritiated water and water. The freezing point temperature of tritiated water is +3.8° C., whereas normal water ($H_2O$) freezes at 0° C. under normal atmospheric conditions. The tritiated water will freeze to a solid state when subjected to temperatures less than +3.8° C. Similarly the freezing point of $D_2O$ is also +3.8° C. In contrast, the "pure" or "normal" water in contact with the frozen tritiated water (HTO or $T_2O$ or the frozen deuterium water (HDO or $D_2O$)) will remain as a liquid until the temperature is further reduced to 0° C.

Attempting to separate the tritiated water from water by freezing the tritiated water and then using mechanical pressure filtration to remove the water would likely prove unsuccessful because of the energy introduced into the water during the pressurization process necessary to force the water through the filters. The increased energy would be sufficient to melt the tritiated water and allow it to pass through the filters with the water.

Co-pending U.S. patent application Ser. No. 12/634,449 entitled "Single Chamber Adsorption Concentrator," by Avery, et al., discloses a method and system that utilizes low grade heat to drive a sorbent/sorbate working pair to separate a solvent from a solute/solvent mixture (the '449 application). One preferred application of the device described in the '449 application is separating water from the salt brine produced by the aluminum smelting industry. The brine solution is introduced into a single chamber shell proximate the concentrator evaporator where the water in the brine can freely evaporate and the resulting water vapor freely flow without inhibition to be either absorbed into the adsorbent modules or condensed by the condenser. The free flow of water vapor is facilitated by continuous operation of the condenser and by maintaining the brine solution at a higher temperature than the cooling fluid driving the condenser. A mist eliminator with a wash down feature located intermediate to the evaporator and the adsorption chamber is provided to collect contaminants that may be carried aloft from the evaporator by the vigorous boiling and rapid vapor movement.

Co-pending application Ser. No. 12/550,290 entitled "Improved Adsorbent—Adsorbate Desalination Unit And Method," (the "'290 Application"), describes an open loop adsorption concentrator system having an internally divided housing and utilizing silica gel and water as the preferred working pair. The '290 Application introduces an economizing heat exchanger and a mist eliminator as new techniques to handle the needs of such an open loop system. As with prior art adsorption chillers, the pressure vessel of the '290 Application is a multi-chambered shell interconnected by a plurality of valves which open and close to intermittently prohibit and allow the flow water vapor from chamber to chamber within the pressure vessel. In the '290 Application, the valves are freely actuated by the differential pressure between the various chambers of the concentrator.

BRIEF SUMMARY OF THE INVENTION

The present invention is a novel device and method for concentrating contaminants in a solution comprising contaminated sorbate and clean sorbate wherein the contaminated sorbate freezes at a higher temperature than the clean sorbate. The present invention is particularly useful for concentrating tritiated water from a tritiated water solution containing relatively little tritiated water by volume. By maintaining the solution at a temperature between the freezing point of the contaminated sorbate and the freezing point of the clean sorbate, the clean sorbate may be evaporated off for processing through a sorbent/sorbate working pair adsorption/desorption cycle. Sensors in the adsorption chamber monitor for the presence of contaminated sorbate vapor. Sensors in the evaporator chamber monitor the temperature of the solution and partial pressure within the evaporator chamber. If contaminated sorbate vapor is detected in the adsorption chamber, or the temperature of the solution rises above the freezing point of the contaminated sorbate, or the partial pressure of the evaporator chamber deviates from the acceptable range of partial pressures, then during desorption, the sorbate vapor is directed to a contaminated condenser for recycling back to the solution. If contaminated sorbate vapor is not detected in the adsorption chamber, and the temperature of the solution did not rise above the freezing point of the contaminated sorbate, and the partial pressure of the evaporator chamber did not deviate from the acceptable range of partial pressures, then during desorption, the sorbate vapor is directed to a clean condenser where it is condensed and removed from the concentrator.

The present invention has many similarities with the concentrators disclosed in the '449 and '290 applications. The present invention uses a similar heat driven engine and a sorbent/sorbate working pair, preferably silica gel and water or zeolite and water. This application describes a concentrator with chambers for the evaporator, the adsorption modules, the mist eliminator(s) and multiple condensers. This present invention includes positively controlled valves between the chambers that control and prevent circulation of the sorbate, the water vapor, under specific operational conditions.

For purposes of this disclosure, the term "sorbate" or "sorbate vapor" will be used to describe all hydrogen-related isotopologues of water in the liquid and gaseous phases, respectively. Sorbate or sorbate vapor may further be described herein as "clean," "pure," "normal," or "not contaminated," meaning $H_2O$ without any other hydrogen-related isotopologues. Conversely, if the sorbate or sorbate vapor comprises any other hydrogen-related isotopologues, it will be described herein as "contaminated," such as "contaminated sorbate vapor."

The present invention describes the use of at least two condensers, one for the condensation of sorbate vapor contaminated with tritiated water and a second for sorbate vapor that is not contaminated. A plurality of condenser valves, typically one for each condenser, are interposed intermediate the adsorption chamber and a corresponding condenser chamber. The condenser valves are operable, preferably electrically or pneumatically, to intermittently prohibit or allow fluid communication between the condenser and the corresponding condenser chamber. Mechanically controlled valves are used to specifically direct the sorbate vapor flow from the evaporator and the adsorption modules to the desired condenser based upon the data generated by monitoring or sensing equipment inside the chambers. One or more temperature sensors and one or more pressure sensors are provided in the evaporator and tritiated water sensors are disposed about the adsorption modules to monitor and provide information regarding the temperature, pressure and presence of tritiated water to a control system which will use such information to control the valves. When the tritiated water sensors detect sorbate vapor contaminated by tritiated water, a signal is generated commanding the control equipment to recycle the contaminated sorbate vapor to the evaporator during the desorption cycle through the contaminated condenser as described in more detail herein.

The present invention also differs from the concentrators described in the '449 and '290 Applications in that it provides the functional elements necessary to separate frozen tritiated water from the cold contaminated water solution or sorbate. Specifically, heat exchangers are used to closely control the temperature in the evaporator chamber in order to maintain the contaminated water solution from which the sorbate will be generated within the desired temperature range. For the method of this invention, the temperature of the contaminated water solution in the evaporator chamber must be controlled in the range of 0° C. to 3.8° C. A heat exchanger and a slow moving circulator are positioned within the evaporator chamber to control the temperature and to minimize added energy.

Another method of controlling the temperature of the sorbate in the evaporator is the management of the rate, volume and temperature at which additional sorbate is introduced into the evaporator to replace the volume of sorbate being evaporated. Introducing additional volumes of sorbate into the evaporator at a relatively higher temperature replaces the heat being removed from the sorbate by the heat of evaporation of the evaporated sorbate.

A description of the evaporation and sublimation characteristics of mixtures of the liquid and solid phases of tritiated water and water may be found in Baumgartner, F., Kim, M. A. (1990). *Isotope effects in the equilibrium and non-equilibrium vaporization of tritiated water and ice. International Journal of Radiation Applications and Instrumentation. Part A. Applied Radiation and Isotopes, Vol.* 41, Iss. 4, 395-399 (the "Baumgartner Paper"). The Baumgartner Paper states that the sublimation of solid phase tritiated water is strongly influenced by the temperature of the tritiated water and the vapor pressure of the gaseous region. If the solid tritiated water is near 1° C. and the vapor pressure is maintained above approximately 5.0 mbar, then sublimation is strongly restricted. Baumgartner Paper, 398, FIG. 3. For the method of this invention, the partial pressure in the evaporator will be maintained above a lower limit of about 4.6 mm of mercury (6.1 mbar), which is the saturation pressure of water at 0° C., and below the upper limit of about 6.0 mm of mercury (8 mbar), the saturation pressure of water at 3.8° C. These limits in pressure are shown as upper and lower boundaries in FIG. 2.

The concentrator will be cycled alternately from a desorption cycle to an adsorption cycle. The desorption cycle will be created by circulating water at an elevated temperature, for example at about 85° C. to about 90° C. (about 185° F. to about 194° F.), through the adsorption chamber containing the sorbent. The elevated temperature will produce a relatively high partial pressure of the sorbate vapor in accordance with the saturation pressure of water at this elevated temperature. Actively controlled valves will prevent the sorbate vapor from returning to the evaporator and will direct the flow of sorbate vapor to one of the two condensers as determined by the control logic. Within the condenser, the water vapor will condense onto the surfaces of the condenser heat exchanger that is maintained at a temperature cooler than the adsorption chamber containing the sorbent, for example at a temperature of about 25° C. to about 30° C. (about 77° F. to about 86° F.).

The adsorption phase is created by circulating cooling water, for example at a temperature of about 25° C. to about 30° C. (about 77° F. to about 86° F.) through the adsorption chamber containing the sorbent. This cooler temperature in the sorbent will promote adsorption of the sorbate which will in turn lower the partial pressure about the sorbate solution in the adsorption chamber. The partial pressure in the adsorption chamber during the adsorption phase will be near or below the lower pressure limit of the desired pressure range. As the temperature cools from desorption to adsorption, the actively controlled valves intermediate the condensers and the adsorption chamber will be closed and the actively controlled valve intermediate the adsorption chamber and the evaporator will be opened slowly under the supervision of the control system to maintain the pressure within the evaporator within the range indicated in FIG. 2. The very dry sorbent at the beginning of the adsorption phase may create a partial pressure that is below the desired pressure range of 4.6 mm of mercury. The partial pressure can be restricted from reaching values below the desired range of FIG. 2 by restricting the amount of sorbate vapor that is allowed to pass through the actively controlled value between the evaporator and the adsorption chamber. Pressures maintained above the lower limit of 4.6 mm of mercury will strongly reduce the amount of tritiated water that will sublimate from the frozen tritiated water and enter the adsorption chamber and the sorbent.

The temperature of the liquid in the evaporator will be controlled between the high and low limits as shown in FIG. 2, i.e., within the range above the lower limit of 0° C., the freezing point of clean water, and below the upper limit of 3.8° C., the freezing point of tritiated or contaminated water. A temperature greater than or exceeding the upper temperature limit of 3.8° C. will melt the frozen tritiated water and allow it to evaporate and contaminate the sorbate vapor collecting in the adsorption chamber. Dropping the temperature below the lower temperature boundary of 0° C. will freeze the surface and inhibit the evaporation of the water.

This invention relates to the use of a heat driven concentrator using specifically a sorbate-sorbent working pair to separate water from a tritiated water contaminated sorbate. Tritiated water is frozen and only clean water evaporates, passes through the adsorption and desorption cycle as a sorbate, and is then condensed and removed. In particular, the selection of silica gel or zeolite as the sorbent in combination with water as the sorbate facilitates the removal of the water from the tritiated water laced water without the burden of pressuring the fluids. In the process described herein the water/tritiated water sorbate is kept at near vacuum and minimal pressurization, so the process avoids sublimation and the increased energy of any previous experience attempting to use filtering techniques.

The adsorption process of the sorbate-sorbent pair will remove heat from the contaminated water solution with the evaporation of the sorbate in a near-vacuum environment. This evaporation process reduces the temperature and cools the contaminated sorbate rather than increasing the energy (and temperature) like a filtration process. A concentration process driven by an adsorption engine will chill the contaminated water solution in the evaporator, creating a tendency for the process to drift downward in temperature. As this drift occurs, the water will begin to freeze at the surface, reducing the adsorption and providing a self-limiting process. The addition of a small amount of heat can re-melt any pure water ice that may occur in an adsorption process without affecting the evaporation/adsorption process. By carefully regulating the temperature of the contaminated water solution, tritiated water will remain in a solid state, trapped within the evaporator while normal water, unfrozen, will evaporate into water vapor which will act as the sorbate for driving the adsorption/desorption process.

Earlier attempts to create separation of tritiated water with filtering provided a process that raised the temperature and pressure of the waters, creating a process that was not self-limiting and even enhanced the melting of the frozen tritiated water by increasing the pressure. In the present process, the temperature of the contaminated water solution and the partial pressure within the evaporator chamber must be strictly maintained because if any of the tritiated water ice is allowed to melt, the tritiated water is evaporated and contaminates the distillate or clean sorbate in the adsorption chamber.

The heat driven concentrator will be configured with an evaporator as the lowest vessel. This allows any condensate that occurs outside of the condensers to run back into the evaporator and recycle through the process. The evaporator chamber will be maintained in a near vacuum environment by the adsorbent, enhancing the evaporation process at the temperature range of 0° C. to 3.8° C.

A mist eliminator section will be located intermediate the evaporator and the adsorption chamber to collect fluid droplets that may be carried from the evaporator as the sorbate boils. Sorbate vapor will migrate through the mist eliminator section to the center adsorption chamber. The adsorption chamber is fitted with numerous adsorption modules, each full of the sorbent. In the adsorption chamber, the sorbate vapor, is adsorbed in the sorbent until the sorbent becomes nearly saturated. During the adsorption process, cooling water will be circulated through the adsorption modules to remove the isosteric heat of adsorption from the sorbent.

Located at the top of the concentrator are at least two condensers. A first condenser, herein called the contaminated condenser, will be dedicated to condensing sorbate vapor that has at least the potential to contain trace amounts of tritiated water as judged by the tritiated water sensors in the adsorption chamber or the temperature monitor(s) in the contaminated water solution in the evaporator.

A second condenser, herein called the clean condenser, will be dedicated to condensing clean, pure sorbate vapor that is judged to be free of any tritiated water contamination.

During the adsorption cycle, the temperature and partial pressure of the contaminated water solution in the evaporator is monitored. The sorbate vapor in the adsorption chamber is also monitored for the presence of tritium. Should either of these monitoring systems indicate the potential for the batch of sorbate vapor generated during the present cycle to be contaminated with gaseous tritiated water, then the sorbate vapor in the adsorption chamber will be recycled back to the evaporator during the next desorption process through the contaminated condenser, rather than allow it to enter into the clean condenser. Only clean sorbate vapor is allowed to enter into the clean condenser where it will be condensed and removed as pure water from the concentrator device.

Once the sorbent, preferably silica gel or zeolite, in the adsorption modules is saturated, the process switches to the desorption cycle. A valve will close and separate the adsorption chamber from the evaporator. Another valve will open the adsorption chamber to either the contaminated condenser or to the clean condenser, as appropriate. A control system, well known in the art and not described in this invention, will continually assess readings from the various sensors and make a determination of which condenser to use for each cycle, and reconfigure the valving between the chambers of the concentrator appropriately. Any sorbate condensed in the contaminated condenser will be returned to the evaporator to be recycled. Any sorbate condensed in the clean condenser will be removed from the system and be available as clean, distilled water that can be put to other uses.

During the desorption cycle, hot water is circulated through the adsorption modules in the adsorption chamber to warm the sorbent and drive off the sorbate vapor contained therein. The isosteric heat of adsorption will be reintroduced to the sorbent modules and the sorbate during this desorption process.

BRIEF DESCRIPTION OF THE DRAWINGS

The particular features and advantages of the invention as well as other objects will become apparent from the following description taken in connection with the accompanying drawings in which.

DETAILED DESCRIPTION OF THE INVENTION

Figure 1:
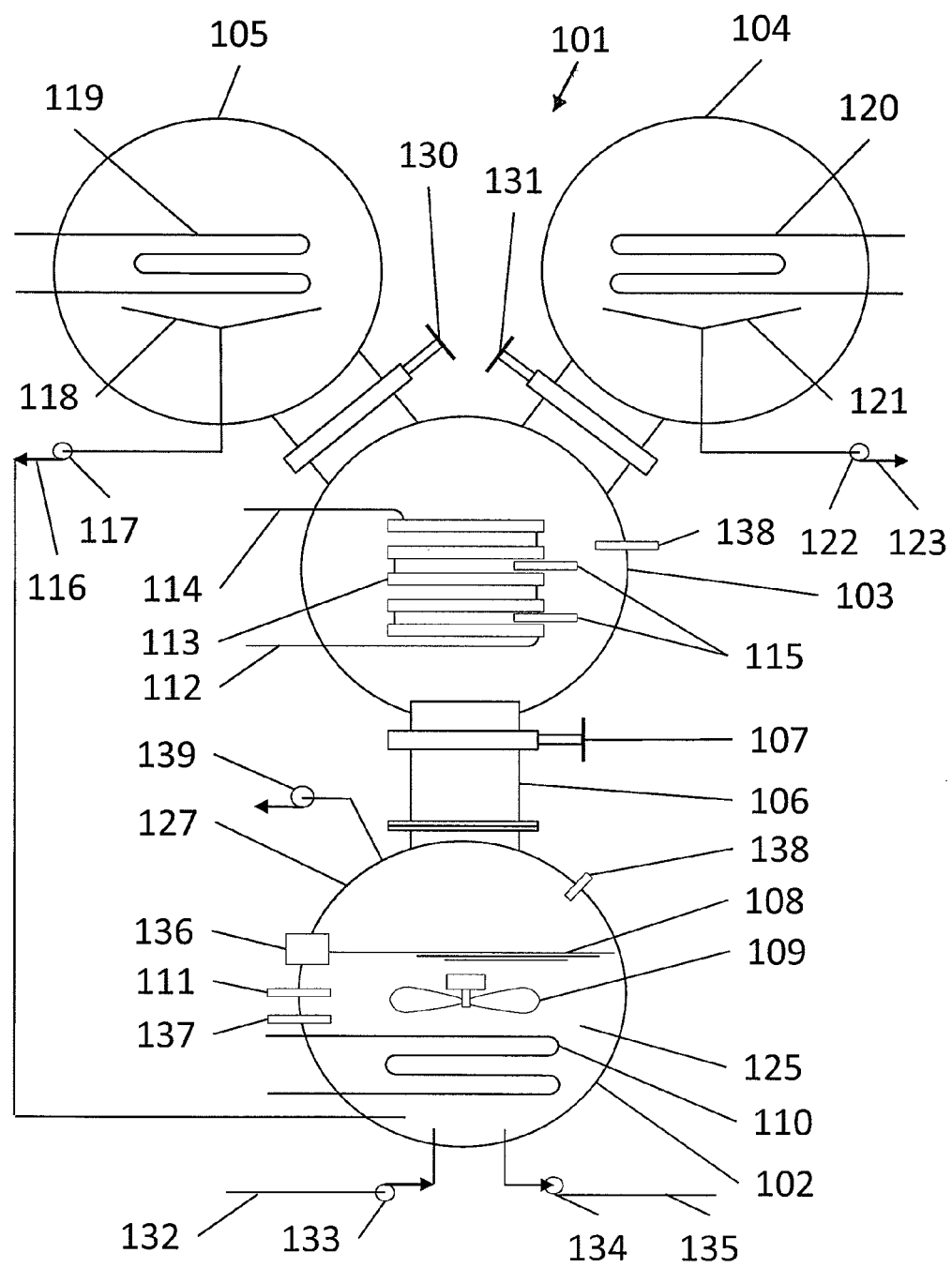
FIG. 1 is a cross sectional schematic representation of a heat driven concentrator with alternate condensers of the present invention.
Figure 2:
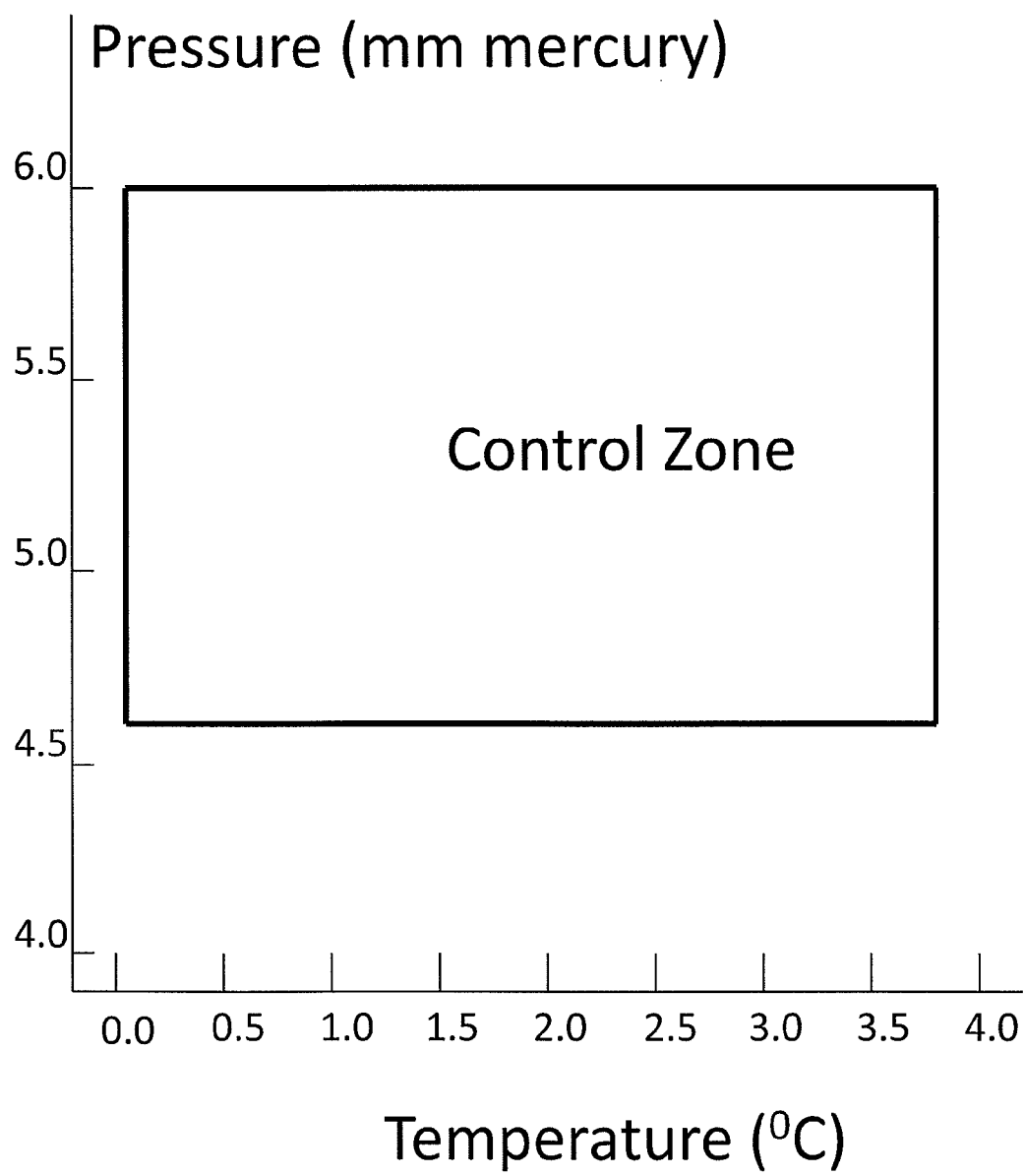
FIG. 2 is a graph illustrating the optimum pressure and temperature ranges to be maintained within the evaporator of the present invention.

FIG. 1 illustrates a heat driven concentrator 101 according to the present invention. The heat driven concentrator 101 is used to practice a novel method of concentrating tritiated water. A contaminated water solution 125 comprising normal water and hydrogen-related isotopologues of water, including tritiated water, is placed into an evaporator chamber 102 maintained at a partial vacuum and near freezing temperature such that the tritiated water will freeze while normal water will not. Frozen tritiated water is separated from liquid water by evaporating liquid water from a cold contaminated water solution maintained within a temperature range of above 0° C. to below 3.8° C., and within a partial pressure range of about 4.6 to about 6 mm mercury in an evaporator chamber. This same process could be used for other separation processes and other fluids at other temperature and pressure combinations providing that one fluid can be frozen and the second evaporated and captured as a sorbate in a sorbate-sorbent working pair. Any such uses of this concentration method are considered within the scope of this invention.

The adsorption process is a two cycle process, an adsorption cycle during which the sorbate is evaporated and adsorbed in the sorbent and a desorption cycle during which the sorbate is driven from the sorbent and condensed. During one or more start-up cycles, in the adsorption cycle, the sorbate vapor that may contain some amount of tritiated water that has also evaporated from the surface 108 of the contaminated water solution 125 in the evaporator chamber 102 and allowed to migrate about the sorbent contained in or carried upon one or more adsorption modules 113 in the adsorption chamber 103. During the adsorption cycle, the heat of evaporation is removed from the contaminated water solution 125 in the evaporator 102 as the sorbate is being evaporated. Heat may be added as necessary through the evaporator heat exchanger 110 during the evaporation process to replace the heat of evaporation. The isosteric heat of adsorption is deposited with the sorbate vapor in the sorbent contained in the adsorption modules 113 as it is adsorbed. Cooling fluid is circulated through the adsorption modules 113 during the adsorption cycle to remove the isosteric heat of adsorption from the sorbent and transfer the heat out of the adsorption chamber 103. Cooling fluid is carried into the adsorption modules through an adsorption heat exchanger inlet 114 and is carried from the adsorption modules 113 through an adsorption heat exchanger outlet 112. Any available well known external fluid cooling means (not shown) and fluid heating means (not shown) may be used to supply cooling fluids or heating fluids, as appropriate for the present invention. The supply of such fluids would be controlled by the control system (not shown).

During the second cycle of the adsorption process, known as the desorption cycle, relatively hot water is circulated through the adsorption modules 113, replacing the isosteric heat of adsorption and driving the sorbate from the sorbent in the modules. Depending on whether the contaminated condenser valve 130 or the clean condenser valve 131 is open, the sorbate vapor will migrate to one of at least two condenser chambers, such as the contaminated condenser chamber 105 or the clean condenser chamber 104, where the sorbate vapor is returned to a liquid state through operation of the respective condenser heat exchanger 119 or 120 located within each respective condenser 105, 104. Cooling fluid is circulated through the appropriate condenser heat exchanger 119 or 120 within the appropriate condenser chamber 105 or 104, thereby condensing the sorbate which collects in a sump 118 or 121 and is carried out of the condenser 105, 104 through an output 116 or 123 driven by a pump 117 or 122. The heat is removed from the concentrator 101 by the cooling fluid from the condenser heat exchanger 119, 120.

FIG. 1 illustrates a cross sectional view of a heat driven concentrator 101 according to the present invention. The concentrator 101 comprises a pressure hull 127 having a plurality of internal chambers 102, 103, 104, 105 connected by mechanically controlled valves 107, 130, 131. Preferably, the valves 107, 130, 131 are all of a type which can withstand and can operate against a pressure differential, such as valves known in the industry as butterfly, gate or globe valves. Alternative configurations of chambers and interconnecting valves are within the contemplation of this invention, the only requirement being that a vacuum can be maintained within each of the chambers. The concentrator 101 is a device configured for repeating a sorbent/sorbate working pair adsorption/desorption cycle.

In a preferred embodiment, the lower-most chamber of the concentrator 101 is an evaporator chamber 102 that contains a contaminated water solution 125 comprising water and other hydrogen-related isotopologues of water, such as tritiated water. The volume of contaminated water solution 125 in the evaporator chamber 102 is relatively high compared to the adsorption chillers described in the '449 Application and the '290 Application in order to achieve the relative temperature stability of the contaminated water solution 125. The volume of solution 125 in the evaporator chamber 102 is indicated by the fluid level 108.

A fluid circulator 109 is disposed within the evaporator chamber 102 below the fluid level 108 to gently agitate the contaminated water solution 125.

A sorbate input line 132 is connected to the evaporator chamber 102 to carry contaminated water solution 125 into the evaporator chamber 102. The flow of contaminated water solution 125 through the sorbate input line 132 and into the evaporator chamber 102 is controlled by operation of a sorbate input pump 133 which is operationally connected to a logic control system, such as a computer (not shown).

Over time, as the concentrator 101 operates, the concentration of tritiated water in the contaminated water solution 125 will increase. A concentrate output line 135 is connected to the evaporator chamber 102 through which the more concentrated tritiated water (contaminated sorbate) solution may be removed from time to time. The more concentrated tritiated water solution may be drained from the evaporator 102 with the aid of a concentrate output pump 134 to draw the concentrated contaminated water solution from the evaporator 102 and force it from the vacuum of the evaporator and through the concentrate output line 135 for collection.

In one preferred embodiment, a mist eliminator 106 is disposed above the evaporator heat exchanger 110 and intermediate the evaporator heat exchanger 110 and the evaporator valve 107. The mist eliminator 106 is provided to trap fluid droplets which may be carried aloft by vigorous boiling of the sorbate and gravitationally return such fluid to the solution 125 in the evaporator 102. The design details and selection of the materials for the variety of suitable types of mist eliminators 106 are well known in the industry and will not be described in this disclosure.

An evaporator valve 107 is disposed intermediate the evaporator chamber 102 and the adsorption chamber 103 to allow fluid communication between the evaporator chamber 102 and adsorption chamber 103. Evaporator valve 107 may be selectively opened and closed to allow or prohibit fluid communication between the evaporator chamber 102 and the adsorption chamber 103. The evaporator valve 107 is operatively connected to the control system (not shown) which actuates and coordinates the opening and closing of all of the mechanical valves and pumps necessary for the operation of the heat driven concentrator 101.

The adsorption chamber 103 of the concentrator 101 houses one or more adsorption modules 113 for carrying a sorbent which can be regenerated, preferably silica gel or zeolite. One or more contaminant sensors, such as tritiated water sensors 115, capable of detecting the presence of contaminants, such as tritiated water, in the sorbate vapor are disposed within the adsorption chamber 103. Tritiated water sensors 115 may also preferably be interspersed between or incorporated into the adsorption modules 113. Tritiated water sensors 115 are operatively connected to a control system (not shown) and generate feedback information or signals indicating the absence or presence of the desired contaminant, in this case, tritiated water, within the adsorption chamber 103. Tritiated water sensors are well known within the art and any suitable tritiated water sensor, such as a liquid scintillation counter for measuring radiation emissions from beta emitting nuclides such as tritium, or a tunable lead-salt diode laser and a multipass optical cell, are used to detect traces of tritiated water in the sorbate vapor.

At least two condenser chambers, such as contaminated condenser chamber 105 and clean condenser chamber 104, are connected in fluid communication with the adsorption chamber 103. Condensers 104, 105 are preferably positioned higher than the adsorption chamber 103, but alternate chamber configurations are possible and within the contemplation of this invention.

A contaminated condenser control valve 130 is positioned intermediate the adsorption chamber 103 and contaminated condenser chamber 105 to allow fluid communication between the adsorption chamber 103 and contaminated condenser chamber 105. Contaminated condenser control valve 130 may be selectively opened and closed to allow or prohibit fluid communication between the adsorption chamber 103 and contaminated condenser chamber 105. The contaminated condenser control valve 130 is operatively connected to the control system (not shown).

A clean condenser control valve 131 is positioned intermediate the adsorption chamber 103 and clean condenser chamber 104 to allow fluid communication between the adsorption chamber 103 and clean condenser chamber 104. Clean condenser control valve 131 may be selectively opened and closed to allow or prohibit fluid communication between the adsorption chamber 103 and clean condenser chamber 104. The clean condenser control valve 131 is operatively connected to the control system (not shown).

Contaminated condenser control valve 130 and clean condenser control valve 131 are both closed during the adsorption cycle to prevent the flow of sorbate vapor directly from the evaporator chamber 102, through the adsorption chamber 103, to either condenser chamber 105 or 104. During the adsorption cycle, evaporator valve 107 is opened to allow sorbate vapor to flow from the evaporator chamber 102 to the adsorption chamber 103.

Contaminated condenser control valve 130 and clean condenser control valve 131 are used during the desorption cycle to actively direct the flow of sorbate vapor rising from the adsorption modules 113 in the adsorption chamber 103 to either the contaminated condenser 105 or the clean condenser 104, depending upon a determination of whether information from any of the thermal sensor 111, tritiated water sensor 115, or pressure sensor 138 have indicated for the present adsorption/desorption cycle the possibility that the sorbate vapor being processed during such cycle may contain a contaminant. For example, if the tritiated water sensors 115 have detected an unacceptable level of tritiated water in the sorbate vapor present in the adsorption chamber 103, then control system would direct the sorbate vapor to the contaminated condenser 105 during this desorption cycle. The control systems may be programmed to react to any suitable amount or concentrations of tritiated water in the sorbate vapor. Sorbate vapor having higher than desired concentrations of tritiated water will result in the opening of the contaminated condenser control valve 130 and the closing of the clean condenser control valve 131, while sorbate having no detected tritiated water (or, if applicable, a concentration of tritiated water lower than the selected standard), will result in the opening of the clean condenser control valve 131 and the closing of the contaminated condenser control valve 130. During the desorption cycle, evaporator valve 107 is closed to prevent the flow of sorbate vapor between the evaporator chamber 102 and the adsorption chamber 103. This will prevent any possible contamination of the clean condenser chamber 104 by contaminated sorbate vapor emanating from the evaporator 102 during this cycle.

The contaminated condenser 105 contains a heat exchanger 119 that is internally cooled by circulating cooling water from an external cooling water source (not shown). The heat exchanger 119 condenses the contaminated sorbate vapor arriving from the adsorption chamber 103 by removing the heat of evaporation whereupon the sorbate vapor condenses into liquid sorbate and drips into a sump system 118 and is removed from the contaminated condenser 105 through an optional pump 117, to the recycle output line 116 and to the evaporator chamber 102. The recycle output line 116 carries contaminated sorbate solution to the evaporator chamber 102.

The clean condenser 104 contains a heat exchanger 120 that is also cooled by internally circulating cooling water from an external cooling water source (not shown). The cooling water condenses the clean sorbate vapor arriving from the adsorption chamber 103 by removing the heat of evaporation whereupon the clean sorbate vapor condenses as clean, uncontaminated sorbate ($H_2O$) and collects in a sump system 121. The sump system 121 removes the distillate (sorbate) from the clean condenser 104 and the concentrator 101 through a clean distillate output line 123 having a pump 122 attached thereto. The clean distillate output line 123 carries clean sorbate to a storage tank (not shown) and is otherwise available for re-use, either in the nuclear process or for myriad other purposes.

The contaminated water solution 125 in the evaporator 102 must be chilled during startup and then maintained within the temperature range of above 0° C. to below 3.8° C. One or more slow moving circulation devices 109 are disposed within the evaporator chamber 102 to circulate the contaminated water solution 125 and to maintain a uniform temperature distribution within the contaminated water solution 125 while adding minimal energy. One or more temperature sensors 111 are disposed within the evaporator chamber 102 for monitoring the temperature of the contaminated water solution 125 and are operatively connected to provide temperature information to the control system (not shown). The control system (not shown) is configured to add or subtract heat to the solution 125 based upon the feedback provided to it from the temperature sensors 111 using one or a combination of different temperature-regulating means as herein described to maintain the temperature within the control limits. For example, a heat exchanger 110 is disposed within the evaporator chamber 102 and may be used to either add or subtract heat to the contaminated water solution 125 by circulating relatively warmer or relatively colder water. Such warmer or cooler water is provided for circulation through the evaporator heat exchanger 110 by external heating or cooling equipment (not shown).

It is anticipated that the general evaporation process occurring within the evaporator 102 during the adsorption cycle will cool the contaminated water solution 125 to its normal operating temperature range of between 0° C. to 3.8° C. during the start up of the concentrator 101. During this initial cool-down phase of the operation of the concentrator 101, the temperature of the contaminated water solution 125 in the evaporator 102 would be taken or measured by one or more evaporator temperature sensors 111. In the most likely scenario, the sorbate vapor evaporated during the initial cool-down phase will be determined by logic within the process control system (not shown) to be contaminated with tritiated water based upon the temperature readings collected by the evaporator thermal sensors 111 or the tritiated water sensors 115 until the measured temperature of the contaminated water solution 125 is below +3.8° C., the freezing temperature of tritiated water. During this contaminated cool-down phase, logic within the process control system (not shown) will direct the sorbate vapor from the evaporator 102 to the sorbent in the adsorption modules 113 of the adsorption chamber 103 during the adsorption cycle. The following desorption cycle will drive the contaminated sorbate vapor from the sorbent of the adsorption modules 113 to the contaminated condenser 105, where it is condensed and returned via the recycle output line 116 to the evaporator 102.

Once the contaminated water solution 125 has been cooled to the proper operational temperature range, the heat exchanger 110 will be the primary means through which the desired temperature range is maintained. Alternately, the heat lost to evaporation may be replaced by introducing additional contaminated water solution 125 to the evaporator 102 at a volume equal to the amount of sorbate evaporated and at a temperature appropriate to replace the heat lost. This additional contaminated water solution 125 would be introduced to the evaporator chamber 102 through the sorbate input line 132 and the sorbate input pump 133. Some heat may also be gained from the surrounding ambient air existing outside of the concentrator 101 through the walls of the evaporator chamber 102 and pressure hull 127. Finally, a small amount of heat will be gained as added energy from the circulator 109.

A sorbate input line 132 and a sorbate input pump 133 deliver the contaminated water solution 125 to the evaporator 102 at a rate that replaces the volume of sorbate vapor being evaporated from the solution 125 in the evaporator 102 with additional solution 125. Logic in a control system (not shown) may be used to monitor the fluid level 108 using a fluid level sensor 136 and adjust the speed of the sorbate input pump 133 to maintain the fluid level 108.

One or more pressure sensors 138 disposed within the adsorption chamber 103 are used to monitor the partial pressure of the adsorption chamber 103 of the concentrator 101 and are operatively connected to the control system (not shown) to provide pressure information to the control system. One or more additional pressure sensors 138 disposed within the evaporator chamber 102 may be used to monitor the partial pressure of the evaporator chamber 102. At the end of the desorption cycle, the partial pressure in the adsorption chamber 103 will drop as the cooler water of the adsorption cycle is introduced to the sorbent modules 113. When the partial pressure sensors 138 indicate that the desorption cycle has ended, the actively controlled valves 130, 131 intermediate the condensers 104, 105 and the adsorption chamber 103 will be closed and the actively controlled evaporator valve 107 intermediate the adsorption chamber 103 and the evaporator 102 will be modulated open, i.e, moved from closed to open in a controlled manner, to equalize the partial pressure of the adsorption chamber 103 and the evaporator chamber 102. As the pressure in the adsorption chamber 103 continues to drop, the actively controlled evaporator valve 107 will be continuously adjusted by the control system (not shown) to limit or maintain the partial pressure measured in the evaporator chamber 102 within the desired range of between about 4.6 mm of mercury to about 6.0 mm of mercury. If the partial pressure in the evaporator chamber varies outside of the desired range, the possibility of the evaporation or sublimation of contaminated sorbate exists.

Once the partial pressure in the adsorption chamber 103 drops to the upper control limit of 6.0 mm of mercury, the pressure sensor 138 in the evaporator 102 will be monitored and the modulation of the evaporator valve 107 would be controlled by the measurements of the partial pressure in the evaporator 102 by the pressure sensors 138. The actively controlled evaporator valve 107 can be additionally used during the adsorption cycle to control the partial pressure in the evaporator 103 so that the partial pressure of the evaporator does not exceed the upper boundary of about 6.0 mm of mercury of the control range and does not drop below the lower boundary of about 4.6 mm of mercury of the control range. Similarly, a vacuum pump 139, initially used to create the vacuum within the concentrator 101, may be controlled by the control system (not shown) to maintain the partial pressure within the desired range.

At the end of the adsorption cycle, the actively controlled evaporator valve 107 is closed to isolate the adsorption chamber 103 from the evaporator 102. The control system (not shown) then determines which condenser 104, 105 to use during the next desorption cycle, choosing the contaminated condenser 105 if either the temperature sensors 111 of the evaporator 102 or the pressure sensors 138 of the evaporator 102 have deviated from the control range during the preceding adsorption cycle, or if a tritium sensor 115 within the adsorption chamber 103 indicates the presence of contaminated sorbate vapor or the potential for contamination of the sorbate vapor in the adsorption chamber 103. Should the potential for contamination in the adsorption chamber 103 exist, then the actively controlled contaminated condenser valve 130 intermediate the adsorption chamber 103 and the associated contaminated condenser 105 is opened by the control system and the desorption cycle is initiated by circulating cooling water through the contaminated condenser heat exchanger 119. If none of the various sensors 111, 115, 138 indicate the possibility that the sorbate vapor in the adsorption chamber 103 has been contaminated with tritium or tritiated water, then the control system (not shown) will open the clean condenser valve 131 between the adsorption chamber 103 and the associated clean condenser chamber 104 and the desorption cycle is initiated by circulating cooling water through the clean condenser heat exchanger 120.

Signals from a sorbate concentration sensor 137 disposed within the evaporator chamber 102 below the fluid level 108 allows the control system to determine the point at which the contaminated water solution 125 reaches a desired concentration of tritiated water. Upon reaching the desired concentration, the adsorption/desorption cycles and the input of additional contaminated water solution 125 through the through the sorbate input line 132 would be suspended by closing the evaporator valve 107 and stopping the sorbate input pump 133. The concentrated contaminated water solution is then drained from the evaporator chamber 102 by using a concentrate output pump 134 to draw the concentrated tritiated sorbate solution from the evaporator chamber 102 through the concentrate output line 135.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

Having thus set forth the nature of the invention, we claim:

1. A method of concentrating contaminated sorbate in a solution comprising contaminated sorbate and clean sorbate wherein said contaminated sorbate has a freezing point and said clean sorbate has a freezing point and wherein the freezing point of said contaminated sorbate is higher than the freezing point of said clean sorbate, said method comprising the steps of:
   (a) cooling the solution to a temperature below the freezing point of the contaminated sorbate and above the freezing point of the clean sorbate;
   (b) repeating a sorbent/sorbate working pair adsorption/desorption cycle, said adsorption/desorption cycle comprising the steps of:
      (i) evaporating sorbate vapor from the solution;
      (ii) adsorbing sorbate vapor into a sorbent which can be regenerated;
      (iii) desorbing sorbate vapor from said sorbent;
      (iv) determining whether the sorbate vapor being processed during each repetition of the adsorption/desorption cycle may contain contaminated sorbate;
      (v) directing the sorbate vapor to either:
         (A) a clean condenser for condensing if the determination for the present adsorption/desorption cycle indicates that the sorbate vapor is clean sorbate vapor; or
         (B) a contaminated condenser for condensing if the determination for the present adsorption/desorption cycle indicates that the sorbate vapor may contain contaminated sorbate vapor;
      (vi) removing the clean sorbate condensed in the clean condenser; and
      (vii) returning the contaminated sorbate condensed in the contaminated condenser to the solution.

2. The method of concentrating contaminated sorbate in a solution of claim 1 further comprising the step of replacing the volume of sorbate evaporated from the solution with additional solution.

3. The method of concentrating contaminated sorbate in a solution of claim 1 wherein the clean sorbate is water and the contaminated sorbate comprises an isotopologue of water.

4. The method of concentrating contaminated sorbate in a solution of claim 1 wherein the clean sorbate is water and the contaminated sorbate comprises tritiated water.

5. The method of concentrating contaminated sorbate in a solution of claim 1 wherein said cooling step further comprises maintaining the solution in a temperature range above 0° C. and below 3.8° C.

6. The method of concentrating contaminated sorbate in a solution of claim 1 further comprising the step of maintaining the partial pressure about the solution in the range above about 4.6 mm of mercury and below about 6.0 mm of mercury.

7. The method of concentrating contaminated sorbate in a solution of claim 1 wherein said determining step further comprises measuring the presence of contaminated sorbate in the sorbate vapor being processed.

8. The method of concentrating contaminated sorbate in a solution of claim 1 wherein said determining step further comprises monitoring the temperature of the solution.

9. The method of concentrating contaminated sorbate in a solution of claim 1 wherein said determining step further comprises monitoring the partial pressure about the solution.

10. The method of concentrating contaminated sorbate in a solution of claim 1 further comprising the step of removing concentrated solution from time to time.

\* \* \* \* \*